United States Patent
Gilbert et al.

(10) Patent No.: US 8,175,877 B2
(45) Date of Patent: May 8, 2012

(54) METHOD AND APPARATUS FOR PREDICTING WORD ACCURACY IN AUTOMATIC SPEECH RECOGNITION SYSTEMS

(75) Inventors: Mazin Gilbert, Warren, NJ (US); Hong Kook Kim, Chatham, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1008 days.

(21) Appl. No.: 11/047,912

(22) Filed: Feb. 2, 2005

(65) Prior Publication Data

US 2006/0173678 A1    Aug. 3, 2006

(51) Int. Cl.
*G10L 15/04* (2006.01)
*G10L 15/00* (2006.01)
*G10L 21/02* (2006.01)

(52) U.S. Cl. ........ 704/251; 704/233; 704/252; 704/231; 704/226

(58) Field of Classification Search ............. 704/219, 704/210, 231–257
See application file for complete search history.

(56) References Cited

U.S. PATENT DOCUMENTS

| | | | | |
|---|---|---|---|---|
| 5,604,839 A * | 2/1997 | Acero et al. | ........... | 704/234 |
| 5,611,019 A * | 3/1997 | Nakatoh et al. | ........... | 704/233 |
| 5,774,847 A * | 6/1998 | Chu et al. | ........... | 704/237 |
| 5,822,728 A * | 10/1998 | Applebaum et al. | ........... | 704/254 |
| 5,848,388 A * | 12/1998 | Power et al. | ........... | 704/239 |
| 5,860,062 A * | 1/1999 | Taniguchi et al. | ........... | 704/256 |
| 5,970,446 A * | 10/1999 | Goldberg et al. | ........... | 704/233 |
| 6,003,003 A * | 12/1999 | Asghar et al. | ........... | 704/243 |
| 6,026,359 A * | 2/2000 | Yamaguchi et al. | ........... | 704/256.4 |
| 6,415,253 B1 * | 7/2002 | Johnson | ........... | 704/210 |
| 6,453,291 B1 * | 9/2002 | Ashley | ........... | 704/233 |
| 6,529,866 B1 * | 3/2003 | Cope et al. | ........... | 704/205 |
| 6,615,170 B1 * | 9/2003 | Liu et al. | ........... | 704/233 |
| 6,735,562 B1 * | 5/2004 | Zhang et al. | ........... | 704/240 |
| 6,772,117 B1 * | 8/2004 | Laurila et al. | ........... | 704/233 |
| 6,965,860 B1 * | 11/2005 | Rees et al. | ........... | 704/227 |
| 7,013,269 B1 * | 3/2006 | Bhaskar et al. | ........... | 704/219 |
| 7,024,353 B2 * | 4/2006 | Ramabadran | ........... | 704/205 |
| 7,047,047 B2 * | 5/2006 | Acero et al. | ........... | 455/563 |
| 7,065,487 B2 * | 6/2006 | Miyazawa | ........... | 704/233 |
| 7,103,540 B2 * | 9/2006 | Droppo et al. | ........... | 704/226 |
| 7,133,825 B2 * | 11/2006 | Bou-Ghazale | ........... | 704/233 |

(Continued)

FOREIGN PATENT DOCUMENTS

EP    0 526 347    2/1993

(Continued)

OTHER PUBLICATIONS

Barker, Cooke, Ellis. Decoding speech in the presence of other sources. Elsevier Speech Communication 45 (2005) 5-25. Published Jan. 2005.*

(Continued)

*Primary Examiner* — David R Hudspeth
*Assistant Examiner* — Matthew Baker

(57) ABSTRACT

The invention comprises a method and apparatus for predicting word accuracy. Specifically, the method comprises obtaining an utterance in speech data where the utterance comprises an actual word string, processing the utterance for generating an interpretation of the actual word string, processing the utterance to identify at least one utterance frame, and predicting a word accuracy associated with the interpretation according to at least one stationary signal-to-noise ratio and at least one non-stationary signal to noise ratio, wherein the at least one stationary signal-to-noise ratio and the at least one non-stationary signal to noise ratio are determined according to a frame energy associated with each of the at least one utterance frame.

18 Claims, 6 Drawing Sheets

U.S. PATENT DOCUMENTS

| | | | | |
|---|---|---|---|---|
| 7,139,703 | B2 * | 11/2006 | Acero et al. | 704/228 |
| 7,165,028 | B2 * | 1/2007 | Gong | 704/233 |
| 7,216,075 | B2 * | 5/2007 | Takagi | 704/233 |
| 7,363,221 | B2 * | 4/2008 | Droppo et al. | 704/226 |
| 7,376,559 | B2 * | 5/2008 | Tato et al. | 704/233 |
| 7,440,891 | B1 * | 10/2008 | Shozakai et al. | 704/233 |
| 7,451,083 | B2 * | 11/2008 | Frey et al. | 704/233 |
| 7,457,745 | B2 * | 11/2008 | Kadambe et al. | 704/216 |
| 7,552,049 | B2 * | 6/2009 | Zhang et al. | 704/231 |
| 7,590,530 | B2 * | 9/2009 | Zhao et al. | 704/226 |
| 2003/0036902 | A1 * | 2/2003 | Gadde | 704/233 |
| 2003/0040908 | A1 * | 2/2003 | Yang et al. | 704/233 |
| 2003/0187637 | A1 * | 10/2003 | Kang et al. | 704/226 |
| 2004/0260547 | A1 * | 12/2004 | Cohen et al. | 704/233 |
| 2005/0080623 | A1 * | 4/2005 | Furui et al. | 704/233 |
| 2005/0143978 | A1 * | 6/2005 | Martin et al. | 704/208 |
| 2006/0100866 | A1 * | 5/2006 | Alewine et al. | 704/226 |
| 2006/0173678 | A1 * | 8/2006 | Gilbert et al. | 704/233 |

FOREIGN PATENT DOCUMENTS

| | | |
|---|---|---|
| JP | 2000-321080 | 11/2000 |
| JP | 2004-109563 | 4/2004 |
| WO | WO 2004/102527 | 11/2004 |

OTHER PUBLICATIONS

Javier Ramirez, Jose C. Segura, Carmen Benitez, Angel de la Torre, Antonio Rubio, Efficient voice activity detection algorithms using long-term speech information, Speech Communication, vol. 42, Issues 3-4, Apr. 2004, pp. 271-287, ISSN 0167-6393, DOI: 10.1016/j.specom.2003.10.002. (http://www.sciencedirect.com/science/article/B6V1C-49V5CW2-1/2.*

Hirsch, Hans-Guenter / Pearce, David (2000): "The AURORA experimental framework for the performance evaluation of speech recognition systems under noisy conditions", In ASR-2000, 181-188.*

Lima, C.; Silva, C.; Tavares, A.; Oliveira, J.; , "On separating environmental and speaker adaptation," Signal Processing and its Applications, 2003. Proceedings. Seventh International Symposium on , vol. 1, no., pp. 413-416 vol. 1, Jul. 1-4, 2003 doi: 10.1109/ISSPA.2003.1224728 URL: http://ieeexplore.ieee.org/stamp/stamp.jsp?tp=& arnumber=1224728&isn.*

Ameya Nitin Deoras and Dr. Mark Hasegawa-Johnson. A Factorial HMM Approach to Robust Isolated Digit Recognition in Non-Stationary Noise. Undergraduate Thesis, University of Illinois at Urbana-Champaign, Dec. 9, 2003.*

Te-Won Lee; Kaisheng Yao; , "Speech enhancement by perceptual filter with sequential noise parameter estimation," Acoustics, Speech, and Signal Processing, 2004. Proceedings. (ICASSP '04). IEEE International Conference on , vol. 1, No., pp. I-693 vol. 1, May 17-21, 2004.*

Hakkani-Tur, D.; Tur, G.; Riccardi, G.; Hong Kook Kim; , "Error Prediction in Spoken Dialog: From Signal-to-Noise Ratio to Semantic Confidence Scores," Acoustics, Speech, and Signal Processing, 2005. Proceedings. (ICAASP '05). IEEE International Conference on , vol. 1, No., pp. 1041-1044, Mar. 18-23, 2005.*

Yao, Kaisheng | Paliwal, Kuldip K | Nakamura, Satoshi. Noise adaptive speech recognition in time-varying noise based on sequential kullback proximal algorithm .ICASSP, IEEE International Conference on Acoustics, Speech and Signal Processing—Proceedings. vol. 1, pp. I/189-I/192, 2002.*

Deng, Li / Acero, Alex / Plumpe, Mike / Huang, Xuedong (2000): "Large-vocabulary speech recognition under adverse acoustic environments", In ICSLP-2000, vol. 3, 806-809.*

H. K. Kim and M. Rahim, "Why Speech Recognizers Make Errors? A Robustness View," presented at Interspeech 2004—ICSLP, 8th Int. Conf. on Spoken Language Processing, Jeju Island, Korea, Oct. 4-8, 2004.

Juang H, "The Past, Present, and Future of Speech Processing", IEEE Signal Processing Magazine, May 1998, pp. 24-48, XP002380892.

Kaisheng Yao, et al., "Residual Noise Compensation for Robust Speech Recognition in Nonstationary Noise" Acoustics, Speech, and Signal Processing, 2000. ICASSP '00. Proceedings, 2000 IEEE International Conference on Jun. 5-9, 2000, Piscataway, NJ, USA, IEEE, vol. 2, pp. 1125-1128, XP0504925.

EPO Search Report dated May 15, 2006, of corresponding European Patent application No. EP 06 10 1170, 2 pages.

Office Action for JP 2006-025205, Feb. 24, 2010, consists of 6 pages. [includes Summary of Notice provided by YKI Patent Attorneys, Apr. 15, 2010].

\* cited by examiner

METHOD AND APPARATUS FOR PREDICTING WORD ACCURACY IN AUTOMATIC SPEECH RECOGNITION SYSTEMS

FIELD OF THE INVENTION

The invention relates to the field of automatic speech recognition and, more specifically, to the use automatic speech recognition systems for predicting speech interpretation accuracy.

BACKGROUND OF THE INVENTION

In general, the performance of automatic speech recognition (ASR) systems degrades when the ASR systems are deployed in real services environments. The degradation of ASR system performance is typically caused by conditions such as background noise, spontaneous speech, and communication noise. A majority of existing ASR systems employ noise-robust algorithms designed to mitigate the effects of noise on the input speech. Unfortunately, the majority of existing algorithms are specifically designed to reduce one particular type of noise at the expense of being more susceptible to other types of noise. Furthermore, the majority of existing algorithms were reverse-engineered using artificial noise environments defined by the algorithm designers, as opposed to the using real services environments to design automatic speech recognition algorithms. As such, existing speech interpretation word accuracy prediction algorithms, which often use measures such as confidence score, are ineffective and often inaccurate.

Accordingly, a need exists in the art for an improved method and apparatus for predicting a word accuracy associated with an interpretation of speech data generated by an automatic speech recognition system.

SUMMARY OF THE INVENTION

In one embodiment, the invention comprises a method and apparatus for predicting word accuracy. Specifically, the method comprises obtaining an utterance in speech data where the utterance comprises an actual word string, processing the utterance for generating an interpretation of the actual word string, processing the utterance to identify at least one utterance frame, and predicting a word accuracy associated with the interpretation according to at least one stationary signal-to-noise ratio and at least one non-stationary signal to noise ratio, wherein the at least one stationary signal-to-noise ratio and the at least one non-stationary signal to noise ratio are determined according to a frame energy associated with each of the at least one utterance frame.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of a communication architecture; however, the methodology of the invention can readily be applied to other environments suitable for use of automatic speech recognition capabilities. In general, automatic speech recognition is broadly defined as a process by which a computer identifies spoken words. As such, an automatic speech recognition system (ASRS) is generally defined as a system for accepting and processing input speech in order to identify, interpret, and respond to the input speech. In general, the present invention enables prediction of word accuracy associated with an interpretation of an utterance of speech data with higher accuracy than existing word accuracy prediction parameters (such as confidence score).

Since the present invention utilizes speech utterance data obtained from a variety of environments, the present invention obviates the need to reverse-engineer automatic speech recognition systems using artificially created noise environments. Using the methodologies of the present invention, the stationary quantity of noise, as well as the time-varying quantity of the noise, is determined and utilized in order to determine word accuracy. In other words, a stationary signal-to-noise ratio (SSNR) and a non-stationary signal-to-noise ratio (NSNR) are measured (using forced alignment from acoustic models of the automatic speech recognition system) and used to compute a predicted word accuracy associated with at least one utterance.

Figure 1:
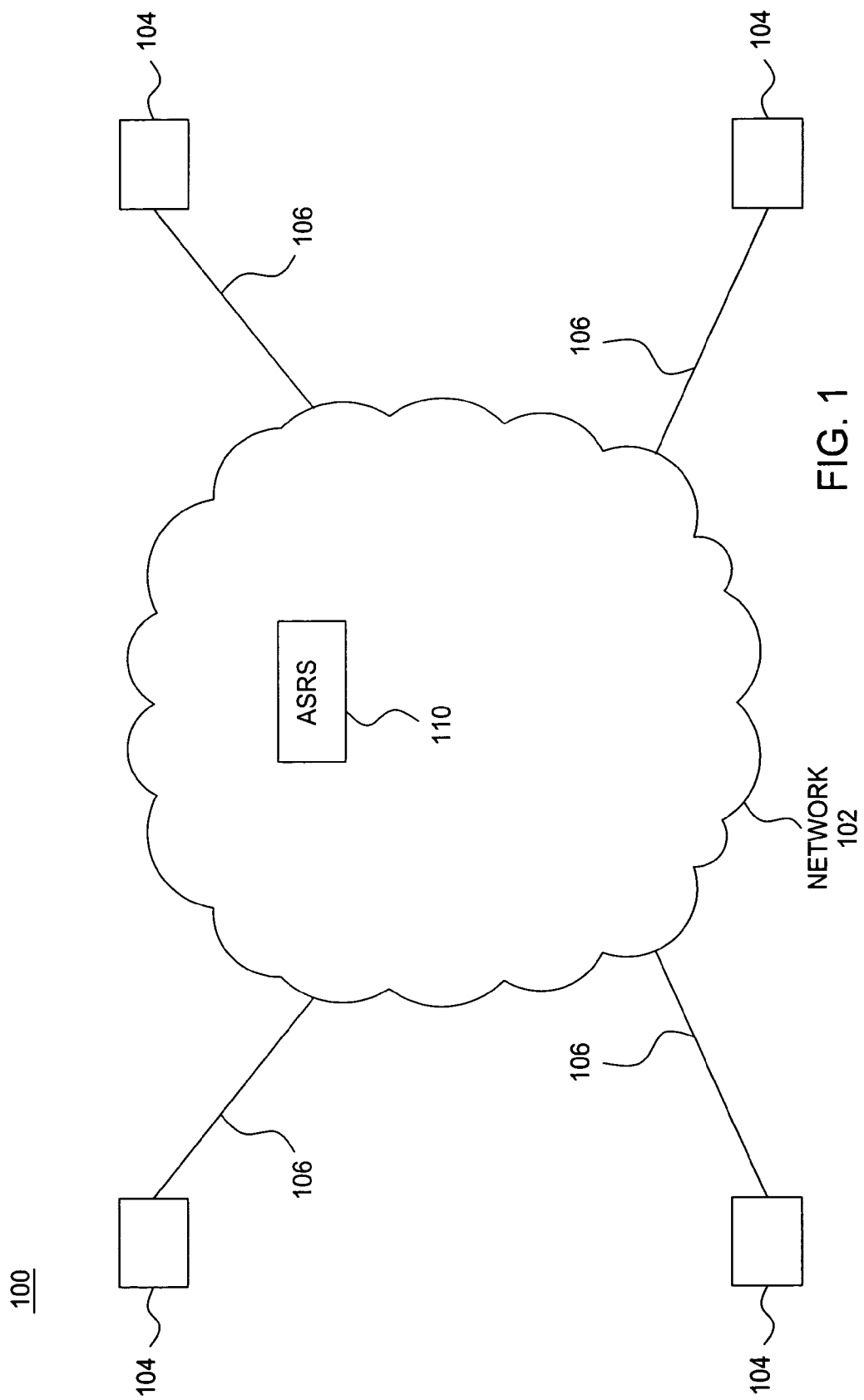
FIG. 1 depicts a communications architecture comprising an automatic speech recognition system.

FIG. 1 depicts a communications architecture comprising an automatic speech recognition system. Specifically, communications architecture 100 of FIG. 1 comprises a network 102, a plurality of network endpoints 104 (collectively, network endpoints 104), and an automatic speech recognition system (ASRS) 110. As depicted in FIG. 1, ASRS 110 is hosted within the network 102, and network endpoints 104 communicate with network 102 via a respective plurality of communication links 106. The ASRS 110 may receive and process input speech received from the network endpoints 104. Although not depicted, those skilled in the art will appreciate that network 102 comprises network elements, associated network communication links, and like networking, network services, and network management systems. Although a single ASRS 110 is depicted, additional ASRS may be hosted with network 102, and may communicate with network 102 via other networks (not depicted).

Figure 2:
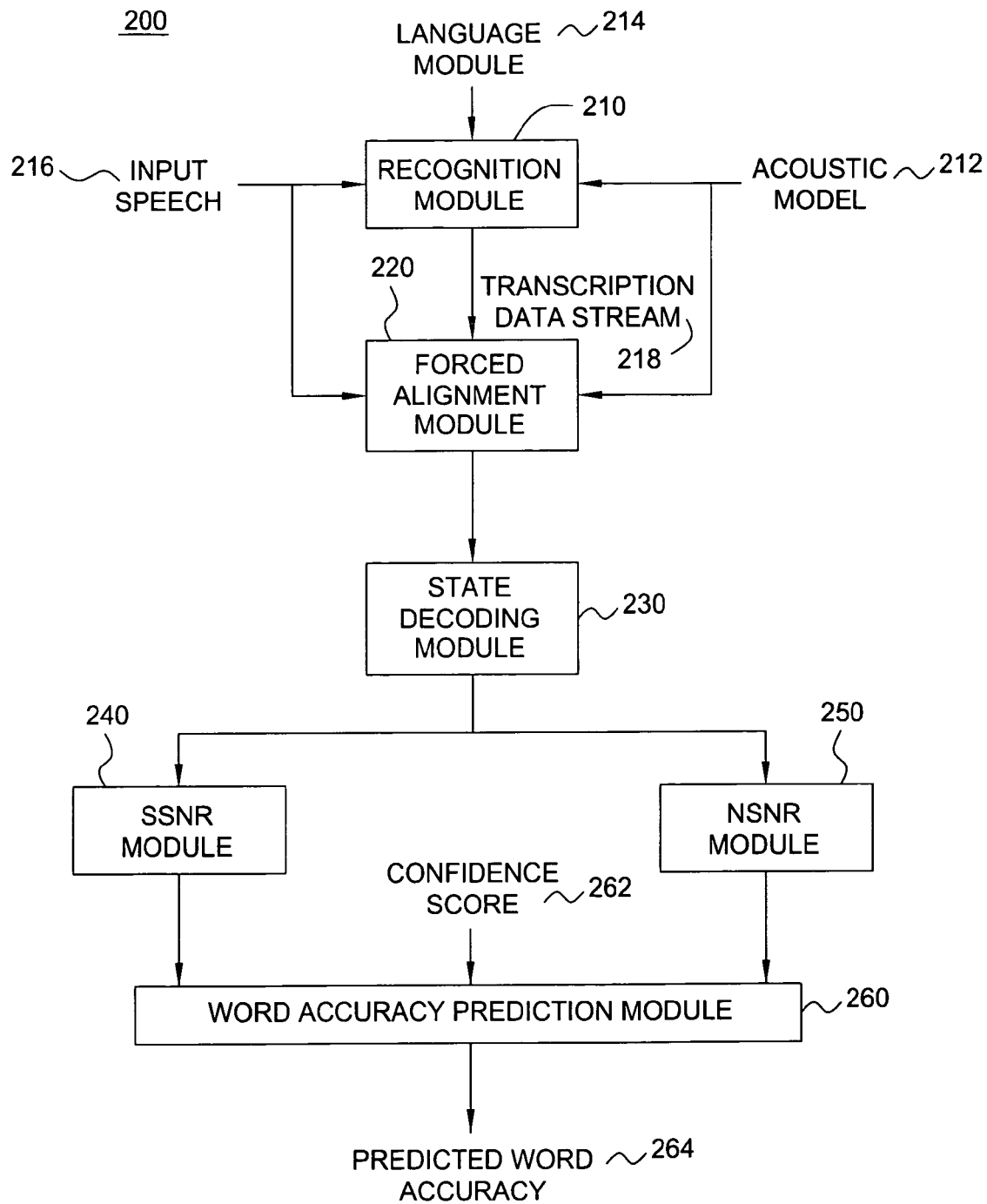
FIG. 2 depicts an automatic speech recognition system architecture.

FIG. 2 depicts an automatic speech recognition system architecture. In general, ASRS architecture 200 of FIG. 2 comprises a system for computing a predicted word accuracy associated with an interpretation (a predicted word string) of an utterance of input speech data. Specifically, ASRS architecture 200 of FIG. 2 comprises a recognition module (RM) 210, a forced alignment module (FAM) 220, a state decoding module (SDM) 230, a stationary signal-to-noise ratio (SSNR) module 240, a non-stationary signal-to-noise ratio (NSNR) module 250, and a word accuracy prediction module (WAPM) 260. As depicted in FIG. 2, the output of RM 210 is coupled to the input of FAM 220. The output of FAM 220 is coupled to the input of SDM 230. The output of SDM 230 is coupled to the inputs of both SSNR module 240 and NSNR module 250. The outputs of SSNR module 240 and NSNR module 250 are coupled to the input of WAPM 260.

The RM 210 obtains input speech (IS) 216 and processes IS 216 using an acoustic model (AM) 212 and a language model (LM) 214. The IS 216 comprises at least one input speech waveform (i.e., speech data). The IS 216 may be obtained from any of a variety of input speech sources such as a voice communication system (e.g., a telephone call between a plurality of users, access to services over the phone, and the like), a desktop application (e.g., voice control of workstations and applications, dictation programs, and the like), a pre-recorded input speech database, and like input speech sources. As such, speech data may comprise at least one of: a spoken syllable, a plurality of syllables, a word, a plurality of words, a sentence, a plurality of sentences, and the like.

The IS 216 comprises at least one utterance. In general, an utterance may be broadly defined as a portion of speech data (e.g., a portion of a syllable, word, sentence, and the like). An utterance comprises at least one actual word string. An actual word string is broadly defined as at least a portion of one actual word spoken by a user. As such, an actual word string comprises at least a portion of one actual word. The RM 210 processes each utterance of IS 216 attempting to recognize each actual word in the actual word string of which the utterance is composed. In other words, RM 210 attempts to interpret (i.e., identify) each actual word in the actual word string, and to generate corresponding predicted words that form an interpretation of the actual word string. As such, an interpretation comprises a predicted word string associated with an utterance. A predicted word string comprises at least one predicted word. In one embodiment, each interpretation (i.e., each predicted word string) produced by RM 210 is output as a portion of a transcription data stream (TDS) 218. As such, for each utterance identified from IS 216, TDS 218 comprises an associated interpretation (i.e., a prediction of at least one recognized word string) of the actual word string of which the utterance is composed.

For example, a given utterance associated with IS 216 may comprise the actual word string HELLO WORLD spoken by a user into a telephone, where the first actual word is HELLO and the second actual word is WORLD. Although the actual word string comprises HELLO WORLD, the RM 210 may interpret the actual word string to comprise the predicted word string HELLO GIRL. In other words, the interpretation of that utterance produced by RM 210 comprises HELLO GIRL. In this example, the first recognized word HELLO is a correct interpretation of the first actual word HELLO, however, the second recognized word GIRL is an incorrect interpretation of the second actual word WORLD. As such, for this utterance, TDS 218 comprises the predicted word string HELLO GIRL.

In one embodiment, RM 210 may use at least one of AM 212 and LM 214 for processing each utterance of IS 216. The AM 212 comprises at least one acoustic model for use in producing a recognized word string. In one embodiment, AM 212 may comprise at least one of: a lexicon model, a word model, a sub-word model (comprising monophones, diphones, triphones, syllables, demi-syllables, and the like), and like acoustic models. The LM 214 comprises at least one language model for use in producing a recognized word string. In general, LM 214 may comprise a deterministic language model for interpreting acoustic input.

In one embodiment, LM 214 may comprise an algorithm for determining the probability associated with a current word based on at least one word directly preceding the current word. For example, LM 214 may comprise an N-gram model for processing rudimentary syntactic information in order to predict the likelihood that specific words are adjacent to other words. In another embodiment, LM 214 may comprise at least one of: an isolated word recognition algorithm, a connected word recognition algorithm, a keyword-spotting algorithm, a continuous speech recognition algorithm, and like modeling algorithms. Although only one acoustic model (i.e., AM 212) and language model (i.e., LM 214) are depicted, additional acoustic and language models, may be input to RM 210 for processing IS 216 to produce at least one recognized word string (illustratively, TDS 218). In one embodiment, AM 212 and LM 214 may be supplemented with dialect models, pronunciation models, and like models for improving speech recognition.

The FAM 220 receives as input the IS 216 input to RM 210 and the at least one recognized word string output from RM 210 (i.e., TDS 218). In one embodiment, FAM 220 may receive as input at least a portion of the AM 212 initially input to RM 210. The FAM 220 uses the combination of AM 212, IS 216, and TDS 218 in order to align the portion of IS 216 associated with an utterance to the corresponding recognized word string generated for that utterance. In other words, for each utterance, FAM 220 aligns the speech waveform of the actual word string to the predicted word string output from RM 210. In one preferred embodiment, FAM 220 may be implemented using a Hidden Markov Model (HMM) forced alignment algorithm. It should be noted that in at least one embodiment, FAM 220 may be implemented using at least one of a voice activity detection (VAD) module and an energy clustering module for aligning an utterance associated with IS 216 to the corresponding recognized word string. The aligned utterance output from FAM 220 is provided to the input of SDM 230.

The SDM 230 receives as input each aligned utterance output from FAM 220. In one embodiment, SDM 230 processes the aligned utterance in order to identify at least one corresponding utterance frame of which the utterance is composed. In general, an utterance frame may be broadly defined as a portion of an utterance. The SDM 230 then processes each utterance frame in order to classify each utterance frame as one of a speech frame and a silence frame. In other words, for a given utterance, an utterance frame belonging to a speech interval of IS 216 is classified as a speech frame, and an utterance frame belonging to a silence interval of IS 216 is classified as a silence frame. In one embodiment, SDM 230 may be implemented using a speech-silence state-decoding algorithm. The classified utterance frames output from SDM 230 are input to SSNR module 240 and NSNR module 250.

The SSNR module 240 computes at least one stationary signal-to-noise ratio for each utterance using a frame energy associated with each of the utterance frames received from SDM 230. The NSNR module 250 computes at least one non-stationary signal-to-noise ratio for each utterance using a frame energy associated with each of the utterance frames received from SDM 230. In one embodiment, SSNR and NSNR are measured in decibels (dB). For each utterance, the SSNR and NSNR values output from SSNR module 240 and NSNR module 250, respectively, are input to WAPM 260 for computing a predicted word accuracy associated with the utterance.

The WAPM 260 receives and processes the SSNR and NSNR in order to compute a predicted word accuracy 264 for the predicted word string associated with the utterance for which the SSNR and NSNR were computed. In general, a predicted word accuracy is broadly defined as a prediction of the percentage of actual words correctly interpreted by an automatic speech recognition system for a given utterance. In one embodiment, an average predicted word accuracy may be computed for a plurality of utterances (i.e., an utterance group). In one embodiment, WAPM 260 may be implemented as a linear least square estimator. In one embodiment, WAPM 260 may receive a confidence score 262 associated with a particular utterance for use in computing the predicted word accuracy of the predicted word string.

Figure 3:
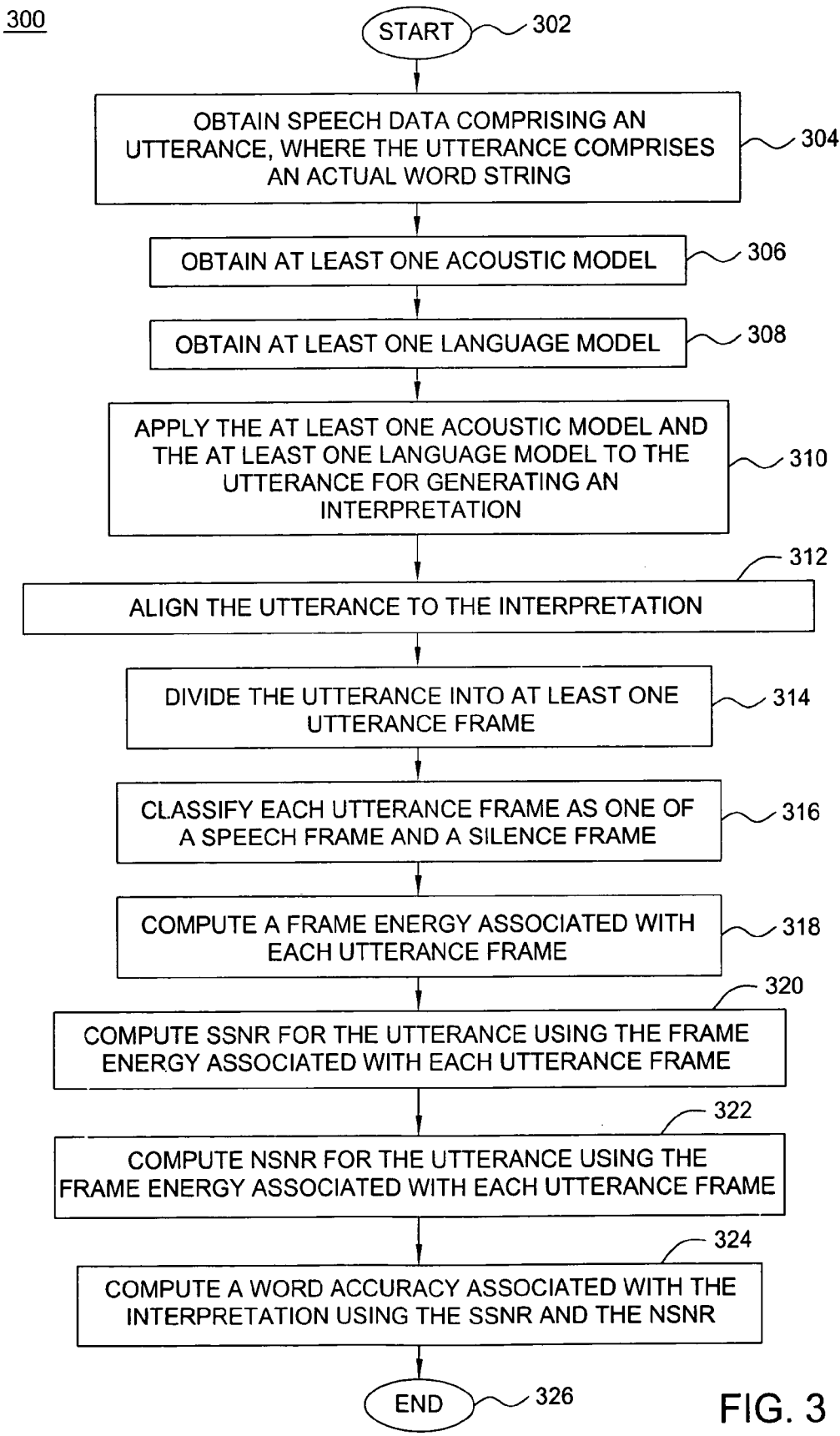
FIG. 3 depicts a flow diagram of a method according one embodiment of the invention.

FIG. 3 depicts a flow diagram of a method according to one embodiment of the invention. Specifically, method 300 of FIG. 3 comprises a method for predicting word accuracy. The method 300 is entered at step 302 and proceeds to step 304. At step 304, speech data comprising at least one utterance is obtained, wherein each of the at least one utterance comprises an actual word string. At step 306, at least one acoustic model is obtained. At step 308, at least one language model is obtained. At step 310, the at least one acoustic model and the at least one language model are applied to the at least one utterance for generating a corresponding interpretation of the utterance. In one embodiment, the interpretation may comprise a predicted word string (i.e., a prediction of the actual word string associated with the utterance).

At step 312, each utterance is aligned to the corresponding interpretation of that utterance as determined in step 310. At step 314, each utterance is partitioned into at least one utterance frame. At step 316, each utterance frame associated with each utterance is classified as one of a speech frame and a silence frame. At step 318, a frame energy is computed for each utterance frame associated with each utterance. At step 320, a SSNR is computed for each utterance using the frame energy associated with each utterance frame of that utterance. At step 322, a NSNR is computed for each utterance using the frame energy associated with each utterance frame of that utterance. At step 324, a predicted word accuracy associated with the interpretation of the utterance is computed using the SSNR computed at step 320 and the NSNR computed at step 322. The method 300 then proceeds to step 326 where method 300 ends.

Figure 4:
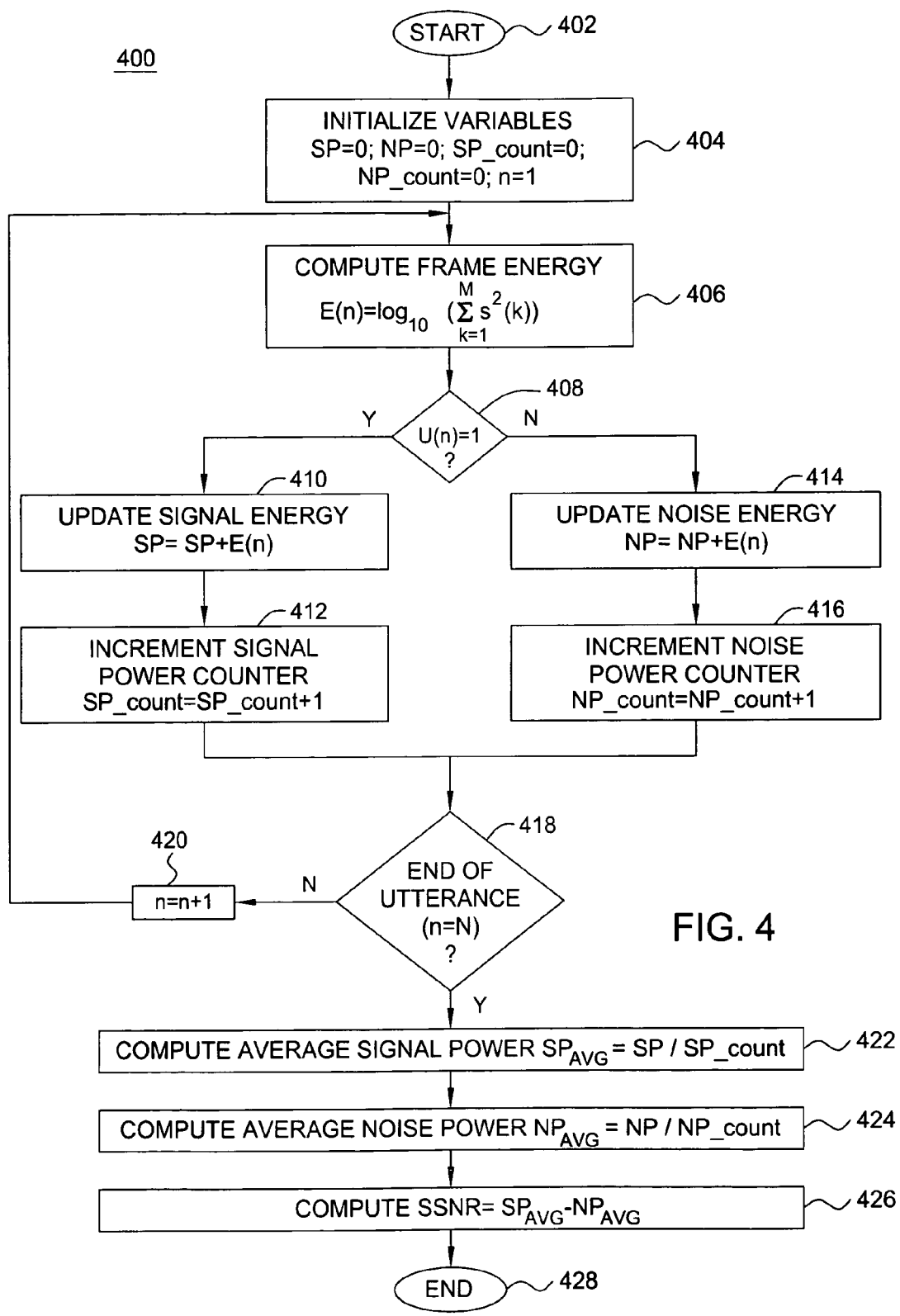
FIG. 4 depicts a detailed flow diagram of a portion of the method depicted in FIG. 3.

FIG. 4 depicts a detailed flow diagram of a portion of the method depicted in FIG. 3. As such, a single step as depicted in FIG. 3 may correspond to multiple steps as depicted in FIG. 4. In general, method 400 of FIG. 4 comprises a method for computing at least one SSNR associated with an utterance. More specifically, method 400 of FIG. 4 comprises a method for computing a SSNR using a frame energy associated with each of at least one utterance frame of which the utterance is composed. The method 400 is entered at step 402 and proceeds to step 404.

At step 404, variables are initialized. The signal power (SP) is initialized to zero (SP=0). The noise power (NP) is initialized to zero (NP=0). The signal power counter (SP_count) is initialized to zero (SP_count=0). The noise power counter (NP_count) is initialized to zero (NP_count=0). The utterance frame counter (n) is initialized to one (n=1). It should be noted that the input speech data comprises at least one utterance, and each utterance comprises N total utterance frames (where N≧1).

At step 406, a frame energy of the $n^{th}$ utterance frame is computed. The frame energy E(n) is computed according to Equation 1:

$$E(n) = \log_{10}\left(\sum_{k=1}^{M} s^2(k)\right) \quad (1)$$

As depicted in Equation 1, frame energy E(n) comprises a logarithmic sum of the squares of s(k), where s(k) comprises a frame sample, and k is an integer from 1 to M (where M comprises a total number of frame samples in the $n^{th}$ utterance frame). A frame sample s(k) may be determined by sampling an utterance frame using any sampling method as known in the art. It should be noted that an utterance frame may comprise at least one associated frame sample. As such, the total number of frame samples M≧1. Although depicted as being computed according to Equation 1, it should be noted that the frame energy may be computed according to at least one other equation.

At step 408, the classification of the utterance frame is determined. In other words, a determination is made as to whether the $n^{th}$ utterance frame is a speech frame or a silence frame (i.e., whether the $n^{th}$ utterance frame belongs to a silence interval or a speech interval). In one embodiment, an utterance frame type variable U(n) may be used to determine whether the $n^{th}$ utterance frame is a speech frame or a silence frame. For example, if U(n) equals one, the $n^{th}$ utterance frame comprises a speech frame, and method 400 proceeds to step 410. Alternatively, if U(n) does not equal one (but rather, equals zero), the $n^{th}$ utterance frame comprises a silence frame, and method 400 proceeds to step 414. Although described with respect to utterance frame type variable U(n), those skilled in the art will appreciate that identification of an utterance frame type may be implemented in at least one of a variety of other manners.

At step 410, signal power (SP) of the $n^{th}$ utterance frame is computed as SP=SP+E(n), where E(n) comprises the frame energy of the $n^{th}$ utterance frame (as computed in step 406). At step 412, signal power counter SP_count is incremented by one (SP_count=SP_count+1). The method 400 then proceeds to step 418. At step 414, noise power (NP) of the $n^{th}$ utterance frame is computed as NP=NP+E(n), where E(n) comprises the frame energy of the $n^{th}$ utterance frame (as computed in step 406). At step 416, noise power counter NP_count is incremented by one (NP_count=NP_count+1). The method 400 then proceeds to step 418. It should be noted that as the frame energy is computed for each utterance frame, and the associated signal energy and noise energy values are updated, at least the most recently computed SP, SP_count, NP, NP_count, and utterance frame counter n values may be stored in at least one of: a memory, database, and like components for storing values while implementing processing loops, as known in the art.

At step 418, a determination is made as to whether the end of the utterance has been reached. In one embodiment, the determination may comprise a determination as to whether utterance frame counter n and total utterance frames N are equal. If n does not equal N, method 400 proceeds to step 420, at which point utterance frame counter n is incremented by one (n=n+1). The method 400 then returns to step 406 at which point the frame energy of the next utterance frame is computed. If n does equal N, method 400 proceeds to step 422. In another embodiment, in which the number of total utterance frames N is unknown, use of utterance frame counter n may be replaced with a determination as to whether all utterance frames have been processed. For example, a determination may be made as to whether the end of the current utterance has been reached.

At step 422, an average signal power ($SP_{AVG}$) associated with the utterance is computed as $SP_{AVG}$=SP/SP_count, where SP and SP_count comprise the final signal power and signal power counter values computed in steps 410 and 412, respectively, before method 400 proceeded to step 422. At step 424, an average noise power ($NP_{AVG}$) associated with the utterance is computed as $NP_{AVG}$=NP/NP_count, where NP and NP_count comprise the final noise power and noise power counter values computed in steps 414 and 416, respectively, before method 400 proceeded to step 424. At step 426, a stationary signal-to-noise ratio associated with the utterance is computed as SSNR=$SP_{AVG}$−$NP_{AVG}$, where $SP_{AVG}$ is the average signal power computed at step 422 and $NP_{AVG}$ is the average noise power computed at step 424. The method 400 then proceeds to step 428 where method 400 ends.

Figure 5:
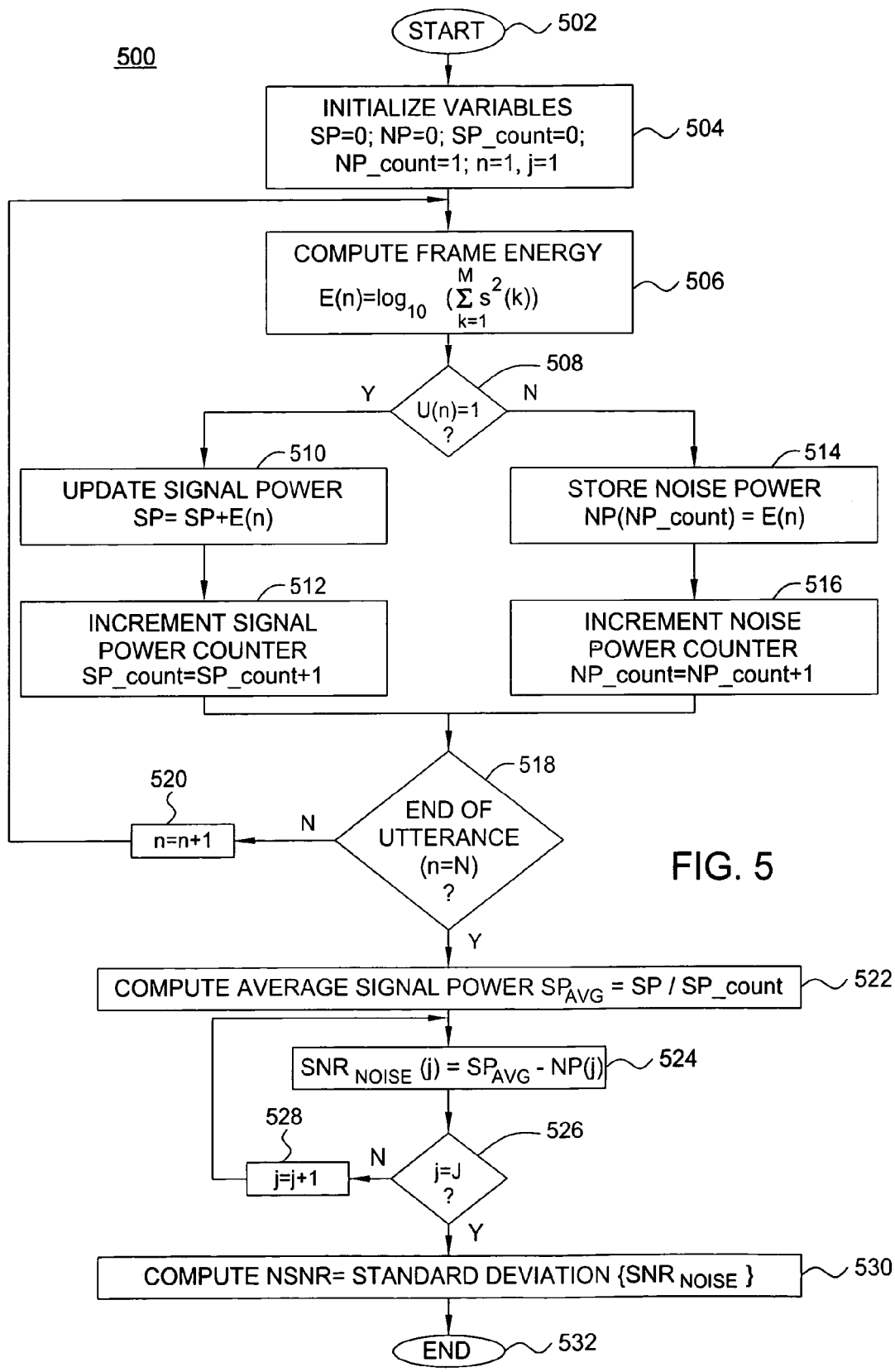
FIG. 5 depicts a detailed flow diagram of a portion of the method depicted in FIG. 3.

FIG. 5 depicts a detailed flow diagram of a portion of the method depicted in FIG. 3. As such, a single step as depicted in FIG. 3 may correspond to multiple steps as depicted in FIG. 5. In general, method 500 of FIG. 5 comprises a method for computing at least one NSNR associated with an utterance. More specifically, method 500 of FIG. 5 comprises a method for computing a NSNR using a frame energy associated with each of at least one utterance frame of which the utterance is composed. The method 500 is entered at step 502 and proceeds to step 504.

At step 504, variables are initialized. The signal power (SP) is initialized to zero (SP=0). The noise power (NP) is initialized to zero (NP=0). The signal power counter (SP_count) is initialized to zero (SP_count=0). The noise power counter (NP_count) is initialized to one (NP_count=1). The utterance frame counter (n) is initialized to one (n=1). The silence frame counter (j) is initialized to one (j=1). It should be noted that the input speech data comprises at least one utterance, and each utterance comprises N total utterance frames (where N≧1). Furthermore, it should be noted that each utterance comprises I total speech frames and J total silence frames such that total utterance frames N=I+J.

At step 506, a frame energy of the $n^{th}$ utterance frame is computed. The frame energy E(n) is computed according to Equation 2:

$$E(n) = \log_{10}\left(\sum_{k=1}^{M} s^2(k)\right) \quad (2)$$

As depicted in Equation 2, frame energy E(n) comprises a logarithmic sum of the squares of s(k), where s(k) comprises a frame sample, and k is an integer from 1 to M (where M comprises a total number of frame samples in the $n^{th}$ utterance frame). A frame sample s(k) may be determined by sampling an utterance frame using any sampling method as known in the art. It should be noted that an utterance frame may comprise at least one associated frame sample. As such, the total number of frame samples M≧1. Although depicted as being computed according to Equation 2, it should be noted that the frame energy may be computed according to at least one other equation.

At step 508, the classification of the utterance frame is determined. In other words, a determination is made as to whether the $n^{th}$ utterance frame is a speech frame or a silence frame (i.e., whether the $n^{th}$ utterance frame belongs to a silence interval or a speech interval). In one embodiment, an utterance frame type variable U(n) may be used to determine whether the $n^{th}$ utterance frame is a speech frame or a silence frame. For example, if U(n) equals one, the $n^{th}$ utterance frame comprises a speech frame, and method 500 proceeds to step 510. Alternatively, if U(n) does not equal one (but rather, equals zero), the $n^{th}$ utterance frame comprises a silence frame, and method 500 proceeds to step 514. Although described with respect to utterance frame type variable U(n), those skilled in the art will appreciate that identification of an utterance frame type may be implemented in at least one of a variety of other manners.

At step 510, the signal power (SP) of the $n^{th}$ utterance frame is computed as SP=SP+E(n), where E(n) comprises the frame energy of the $n^{th}$ utterance frame (as computed in step 506). At step 512, signal power counter SP_count is incremented by one (SP_count=SP_count+1). The method 500 then proceeds to step 518. At step 514, the noise power (NP) of $n^{th}$ utterance frame is computed as NP(NP_count)=E(n), where E(n) comprises the frame energy of the $n^{th}$ utterance frame (as computed in step 506). At step 516, noise power counter NP_count is incremented by one (NP_count=NP_count+1). In other words, for each utterance frame classified as a noise frame, the noise power is set to the frame energy of that utterance frame.

As such, the frame energy E(n) and noise power counter NP_count associated with each noise frame are stored in at least one of: a memory, database, and like components as known in the art. Furthermore, as the frame energy is computed for each utterance frame, and the associated signal energy value is updated, at least the most recently computed SP, SP_count, and utterance frame counter n values may be stored in at least one of: a memory, database, and like components for storing values while implementing processing loops, as known in the art. The method 500 then proceeds to step 518.

At step 518, a determination is made as to whether the end of the utterance has been reached. In one embodiment, the determination may comprise a determination as to whether utterance frame counter n and total utterance frames N are equal. If n does not equal N, method 500 proceeds to step 520, at which point utterance frame counter n is incremented by one (n=n+1). The method 500 then returns to step 506 at which point the frame energy of the next utterance frame is computed. If n does equal N, method 500 proceeds to step 522. In another embodiment, in which the number of total utterance frames N is unknown, the use of utterance frame counter n may be replaced with a determination as to whether all utterance frames have been processed. For example, a determination may be made as to whether the end of the current utterance has been reached.

At step 522, an average signal power ($SP_{AVG}$) associated with the utterance is computed as $SP_{AVG}$=SP/SP_count, where SP and SP_count comprise the final signal power and signal power counter values computed in steps 510 and 512, respectively, before method 500 proceeded to step 522. At step 524, a noise SNR is computed for the $j^{th}$ silence frame. The noise SNR is computed as $SNR_{NOISE}$(j)=$SP_{AVG}$−NP(j), where SP comprises the signal power computed in step 522 and NP(j) corresponds to the noise power associated with the $j^{th}$ silence frame, as computed in each iteration of step 516. It should be noted that since utterance frame counter n counts both speech frames and silence frames (noise frames), the indexing of E(n) may not match the indexing of E(j). For example, assuming the first utterance frame (n=1) is a speech frame, and the second utterance frame (n=2) is a silence frame, computation of $SNR_{NOISE}$ requires retrieval and re-indexing of the silence frame such that E(n=2) computed in step 516 corresponds to NP(j=1) in step 524. In one embodiment, the $SNR_{NOISE}$ value is stored for each silence frame (in at least one of: a memory, database, and like components as known in the art).

At step 526, a determination is made as to whether a noise SNR has been computed for the final noise frame ($SNR_{NOISE}$(J)). In one embodiment, the determination may comprise a determination as to whether silence frame counter j and total silence frames J are equal. If j does not equal J, method 500 proceeds to step 528, at which point silence frame counter j is incremented by one (j=j+1). The method 500 then returns to step 524, at which point the noise SNR of the next silence frame is computed. If j does equal J, method 500 proceeds to step 530. As such, successive computations of $SNR_{NOISE}$ for each silence frame (via the processing loop comprising steps 524, 526, and 528) produces a set of noise SNRs, where the set of noise SNRs comprises at least one noise SNR value. At step 530, a non-stationary signal-to-noise ratio (NSNR) associated with the utterance is computed as NSNR=standard deviation $\{SNR_{NOISE}(j)\}$, where $SNR_{NOISE}(j)$ comprises the set of noise SNRs computed at step 524. In other words, the NSNR comprises non-stationarity of noise power associated with the specified utterance. The method 500 then proceeds to step 532 where the method 500 ends.

It should be noted that NSNR comprises the standard deviation of noise power normalized by the average signal power. In other words, NSNR may be alternatively expressed according to Equation 3:

$$\left(\frac{1}{J}\sum_{n=1}^{J}(SP_{AVG}-E(n))^2 - SSNR^2\right)^{1/2} \quad (3)$$

In Equation 3, J comprises the total number of silence frames in the utterance, $SP_{AVG}$ comprises the average signal power of the utterance, $E(n)$ comprises the frame energy of the $n^{th}$ silence frame, and SSNR comprises the stationary signal-to-noise ratio of the utterance. It should be noted that as expressed in Equation 3, NSNR becomes smaller as the average of the frame-dependent SNR (defined by $SP_{AVG}-E(n)$) approaches the SSNR value. As such, smaller variations in the noise characteristics among different frames of an utterance may result in a smaller NSNR, thereby increasing the predicted word accuracy of the interpretation of that utterance.

As described above, for each utterance of speech data, WAPM 260 receives as input the stationary signal-to-noise ratio (SSNR) value computed according to the method 400 of FIG. 4 and the non-stationary signal-to-noise ratio (NSNR) value computed according to the method 500 of FIG. 5. In one embodiment, WAPM 260 may receive as input at least one associated confidence score. The WAPM 260 uses the SSNR and the NSNR in order to compute a predicted word accuracy associated with an utterance. An actual word accuracy comprises a percentage of predicted words (in a predicted word string) that correctly match associated actual words of which the utterance is comprised. As such, the predicted word accuracy comprises a prediction of the actual word accuracy.

In continuation of the example described herein, the actual word accuracy associated with the utterance comprising the actual words "HELLO WORLD" may be determined manually using the actual word set (utterance from IS 216) and the predicted word set (TDS 218) output by RM 210. As described above, the actual word string of the utterance comprises HELLO WORLD, and the predicted word string comprises HELLO GIRL. As such, the actual word accuracy associated with the interpretation is fifty percent since one of the two predicted words (i.e., the word HELLO) was correctly predicted, and the other of the two predicted words (i.e., the word GIRL) was incorrectly predicted. As described herein, a prediction of the actual word accuracy (i.e., a predicted word accuracy) may be computed using the SSNR and NSNR values associated with that utterance.

In one embodiment, WAPM 260 may be implemented using a linear least square estimator. For example, the linear least square estimator may be configured such that at least one variable may be established in a manner tending to substantially minimize a predicted word accuracy error associated with an utterance, thereby maximizing the predicted word accuracy associated with the utterance. In one embodiment, an average predicted word accuracy error associated with at least one utterance may be minimized. The average predicted word accuracy error is computed according to Equation 4, as follows:

$$\frac{1}{Z}\sum_{x=1}^{Z}\varepsilon_x^2 \quad (4)$$

In Equation 4, $\varepsilon_x$ comprises a predicted word accuracy error associated with the $x^{th}$ utterance and Z comprises a total number of utterances identified from the input speech.

In one embodiment, predicted word accuracy error term $\varepsilon_x$ of Equation 4 may be computed according to Equation 5, as follows:

$$\varepsilon_x = asr_x - a\hat{s}r_x \quad (5)$$

In Equation 5, $asr_x$ comprises the actual word accuracy associated with the $x^{th}$ utterance, and $a\hat{s}r_x$ comprises the predicted word accuracy associated with the $x^{th}$ utterance. In other words, predicted word accuracy error $\varepsilon_x$ may be minimized by ensuring that predicted word accuracy $a\hat{s}r_x$ approaches actual word accuracy $asr_x$ for the $x^{th}$ utterance.

In one embodiment, the predicted word accuracy $a\hat{s}r_x$ of Equation 5 may be computed according to Equation 6, as follows:

$$a\hat{s}r_x = \alpha(SSNR_x) + \beta(NSNR_x) + \gamma(\text{confidence-score}_x) + \delta \quad (6)$$

In Equation 6, $SSNR_x$ comprises the stationary signal-to-noise ratio associated with the $x^{th}$ utterance, $NSNR_x$ comprises the non-stationary signal-to-noise ratio associated with the $x^{th}$ utterance, and confidence-score$_x$ comprises a confidence score associated with the $x^{th}$ utterance. As such, $\alpha$, $\beta$, $\gamma$, and $\delta$ comprise configurable variables, the values of which may be chosen in a manner tending to substantially minimize Equation 4. In one embodiment, the $\gamma$(confidence-score$_x$) term of Equation 6 may be optionally removed from Equation 6.

Although described with respect to a linear least square estimator, it should be noted that the predicted word accuracy, as well as the associated predicted word accuracy error, may be computed using various algorithms and components other than a linear least square estimator. For example, various non-linear algorithms may be employed for computing the predicted word accuracy and minimizing the associated predicted word accuracy error. Although depicted and described with respect to FIG. 4 and FIG. 5 as comprising specific variables, it should be noted that the methodologies depicted and described with respect to FIG. 3, FIG. 4, and FIG. 5 may be implemented using comparable components, algorithms, variable sets, decision steps, computational methods, and like processing designs.

Figure 6:
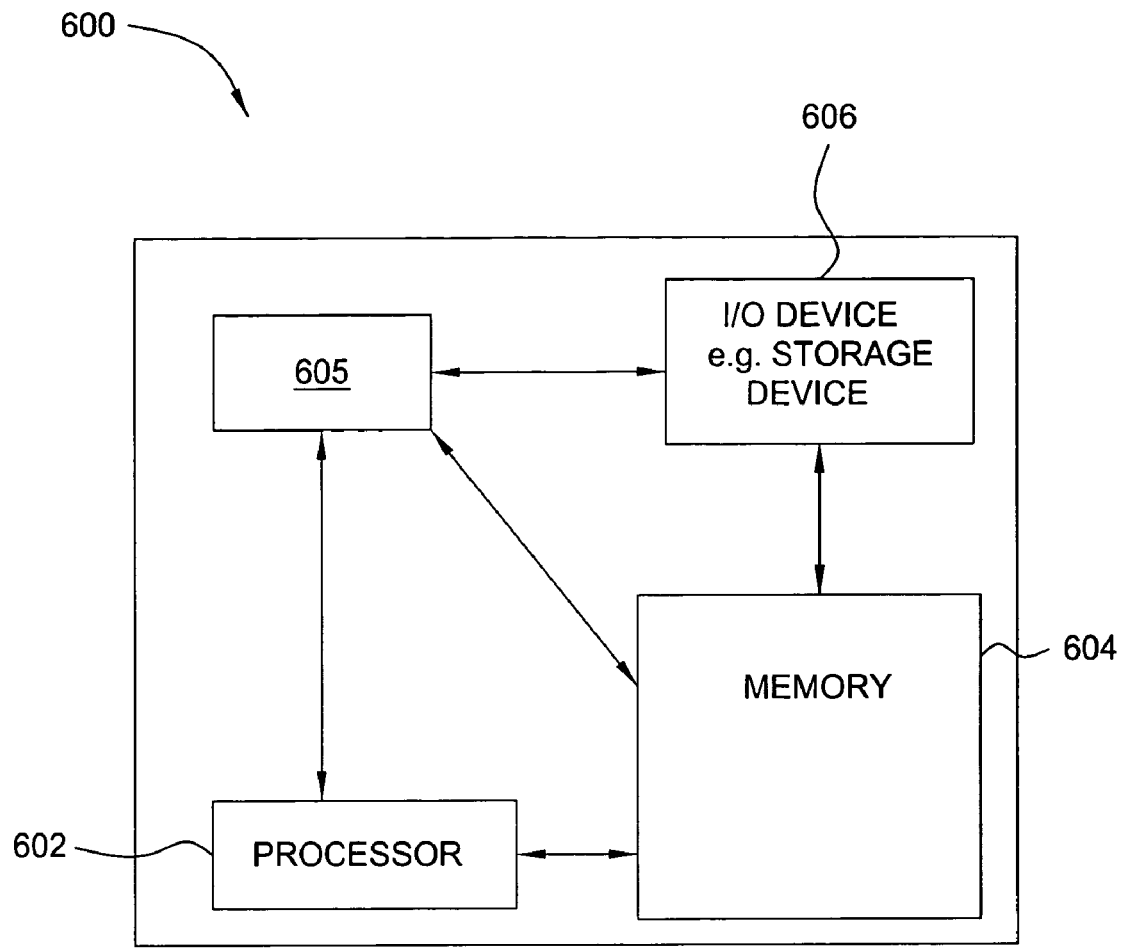
FIG. 6 depicts a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), an word accuracy prediction module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present word accuracy prediction module or process 605 can be loaded into memory 604 and executed by processor 602 to implement the functions as discussed above. As such, the present word accuracy prediction process 605 (including associated data structures) of the present invention can be stored on a computer readable medium or carrier, e.g., RAM memory, magnetic or optical drive or diskette and the like.

It is contemplated by the inventors that at least a portion of the described actions/functions may be combined into fewer functional elements/modules. For example, the actions/functions associated with the forced alignment module and the state decoding module may be combined into one functional element/module. Similarly, it is contemplated by the inventors that various actions/functions may be performed by other functional elements/modules or that the actions/functions may be distributed across the various functional elements/modules in a different manner.

Furthermore, although described herein as being performed by ASRS 110, those skilled in the art will appreciate that at least a portion of the methodologies of the present invention may be performed by at least one other system, or, optionally, may be distributed across a plurality of systems. For example, at least a portion of the methodologies of the present invention may be implemented as a portion of an element management system, a network management system, and like systems in communication network based ASR systems. Similarly, at least a portion of the methodologies of the present invention may be implemented as a portion of a desktop system, a desktop application, and like systems and applications supporting ASR functionality.

Although various embodiments which incorporate the teachings of the present invention have been shown and described in detail herein, those skilled in the art can readily devise many other varied embodiments that still incorporate these teachings.

What is claimed is:

1. A method for predicting a word accuracy, comprising:
   obtaining an utterance in speech data, wherein the utterance comprises an actual word string;
   processing the utterance for generating an interpretation of the actual word string;
   processing the utterance to identify an utterance frame; and
   calculating a prediction of a word accuracy associated with the interpretation based on a stationary signal-to-noise ratio and a non-stationary signal-to-noise ratio, wherein at least one of the stationary signal-to-noise ratio and the non-stationary signal-to-noise ratio is weighted, wherein the stationary signal-to-noise ratio and the non-stationary signal-to-noise ratio are determined according to a frame energy associated with the utterance frame, and wherein the calculating comprises:
   computing the stationary signal-to-noise ratio for the utterance;
   computing the non-stationary signal-to-noise ratio for the utterance; and
   computing the prediction of the word accuracy associated with the interpretation using the stationary signal-to-noise ratio and the non-stationary signal-to-noise ratio.

2. The method of claim 1, wherein the obtaining the utterance in speech data, the processing the utterance to generate the interpretation of the actual word string, the processing the utterance to identify the utterance frame, and the calculating the prediction of the word accuracy are repeated for an additional utterance.

3. The method of claim 1, wherein the processing the utterance to generate the interpretation of the actual word string, comprises:
   obtaining an acoustic model;
   obtaining a language model; and
   applying the acoustic model and the language model to the utterance for generating the interpretation.

4. The method of claim 1, wherein the processing the utterance to identify the utterance frame comprises:
   aligning the utterance to the interpretation;
   partitioning the utterance into the utterance frame; and
   classifying the utterance frame as one of: a speech frame or a silence frame.

5. The method of claim 4, wherein the aligning is performed according to a forced alignment algorithm.

6. The method of claim 4, wherein the classifying is performed according to a speech-silence decoding algorithm.

7. The method of claim 1, wherein the computing the stationary signal-to-noise ratio comprises:
   computing an average signal power for the utterance;
   computing an average noise power for the utterance; and
   calculating the stationary signal-to-noise ratio using the average signal power and the average noise power.

8. The method of claim 7, wherein the average signal power and the average noise power are computed using the frame energy associated with the utterance frame.

9. The method of claim 1, wherein the computing the non-stationary signal-to-noise ratio comprises:
   computing an average signal power for the utterance;
   determining a noise power for each of a plurality of utterance frames of the utterance classified as silence frames;
   computing a noise signal-to-noise ratio for each of the plurality of utterance frames, wherein the noise signal-to-noise ratio for one of the plurality of utterance frames is computed using the average signal power and the noise power of the one of the plurality of utterance frames; and
   computing a standard deviation of the noise signal-to-noise ratios for the plurality of utterance frames.

10. The method of claim 9, wherein the average signal power and the noise power are computed using the frame energy associated with each of the plurality of utterance frames.

11. The method of claim 1, wherein the computing the prediction of the word accuracy associated with the interpretation is performed according to a linear least square algorithm.

12. The method of claim 1, wherein the computing the prediction of the word accuracy associated with the interpretation is performed using a confidence score.

13. The method of claim 1, wherein computing the frame energy comprises:
   sampling the utterance frame to produce an utterance frame sample;
   generating a squared utterance frame sample by squaring the utterance frame sample;

computing a summation of the squared utterance frame sample; and computing a logarithm of the summation.

14. A non-transitory computer readable medium storing a software program, that, when executed by a computer, causes the computer to perform a method comprising:

obtaining an utterance in speech data, wherein the utterance comprises an actual word string;

processing the utterance for generating an interpretation of the actual word string;

processing the utterance to identify an utterance frame; and calculating a prediction of a word accuracy associated with the interpretation based on a stationary signal-to-noise ratio and a non-stationary signal-to-noise ratio, wherein at least one of the stationary signal-to-noise ratio and the non-stationary signal-to-noise ratio is weighted, wherein the stationary signal-to-noise ratio and the non-stationary signal-to-noise ratio are determined according to a frame energy associated with the utterance frame, and wherein the calculating comprises:

computing the stationary signal-to-noise ratio for the utterance;

computing the non-stationary signal-to-noise ratio for the utterance; and computing the prediction of the word accuracy associated with the interpretation using the stationary signal-to-noise ratio and the non-stationary signal-to-noise ratio.

15. The non-transitory computer readable medium of claim 14, wherein the processing the utterance to generate the interpretation of the actual word string, comprises:

obtaining an acoustic model;

obtaining a language model; and applying the acoustic model and the language model to the utterance for generating a predicted word string.

16. The non-transitory computer readable medium of claim 14, wherein the processing the utterance to identify the utterance frame comprises:

aligning the utterance to the interpretation;

partitioning the utterance into the utterance frame; and classifying the utterance frame as one of: a speech frame or a silence frame.

17. The non-transitory computer readable medium of claim 14, wherein the computing the non-stationary signal-to-noise ratio comprises:

computing an average signal power for the utterance;

determining a noise power for each of a plurality of utterance frames of the utterance classified as silence frames;

computing a noise signal-to-noise ratio for each of the plurality of utterance frames, wherein the noise signal-to-noise ratio for one of the plurality of utterance frames is computed using the average signal power and the noise power of the one of the plurality of utterance frames; and computing a standard deviation of the noise signal-to-noise ratios for the plurality of utterance frames.

18. An apparatus for predicting a word accuracy, comprising:

a processor configured to:

obtain an utterance in speech data, wherein the utterance comprises an actual word string;

process the utterance for generating an interpretation of the actual word string;

process the utterance to identify an utterance frame; and calculate a prediction of a word accuracy associated with the interpretation based on a stationary signal-to-noise ratio and a non-stationary signal-to-noise ratio, wherein at least one of the stationary signal-to-noise ratio and the non-stationary signal-to-noise ratio is weighted, wherein the stationary signal-to-noise ratio and the non-stationary signal-to-noise ratio are determined according to a frame energy associated with the utterance frame, and wherein the processor is configured to calculate the prediction of the word accuracy associated with the interpretation by:

computing the stationary signal-to-noise ratio for the utterance;

computing the non-stationary signal-to-noise ratio for the utterance; and computing the prediction of the word accuracy associated with the interpretation using the stationary signal-to-noise ratio and the non-stationary signal-to-noise ratio.

* * * * *